United States Patent [19]

Kramer

[11] Patent Number: 4,927,007
[45] Date of Patent: May 22, 1990

[54] CONVEYOR SUPPORT

[75] Inventor: James H. Kramer, Akron, Ohio

[73] Assignee: The B. F. Goodrich Company, Akron, Ohio

[21] Appl. No.: 413,145

[22] Filed: Sep. 27, 1989

[51] Int. Cl.⁵ .............................................. B65G 15/08
[52] U.S. Cl. .................................. 198/823; 198/860.3
[58] Field of Search ..................... 198/823, 824, 860.1, 198/860.3

[56] References Cited

U.S. PATENT DOCUMENTS

| 1,850,891 | 3/1932 | Nyborg | 198/823 |
| 3,443,678 | 5/1969 | Reilly | 198/823 |

FOREIGN PATENT DOCUMENTS

| 0370121 | 4/1973 | U.S.S.R. | 198/823 |
| 0558820 | 7/1977 | U.S.S.R. | 198/823 |
| 2188018 | 9/1987 | United Kingdom | 198/823 |

Primary Examiner—David A. Bucci
Assistant Examiner—D. Glenn Dayoan
Attorney, Agent, or Firm—Joseph Januszkiewicz

[57] ABSTRACT

A troughing conveyor support assembly for an endless conveyor belt having a pair of laterally spaced rigid supports wherein each support is fastened to the outer shell of a torsion spring. Each torsion spring has an inner shaft member that is connected to one end of a pivotable arm member. The arm member has its other end connected to a rod, the laterally spaced rods pivotally support the respective ends of a flexible tensile backing member which in turn has a strip of low friction material secured thereto for support the bottom surface of a conveyor belt.

5 Claims, 5 Drawing Sheets

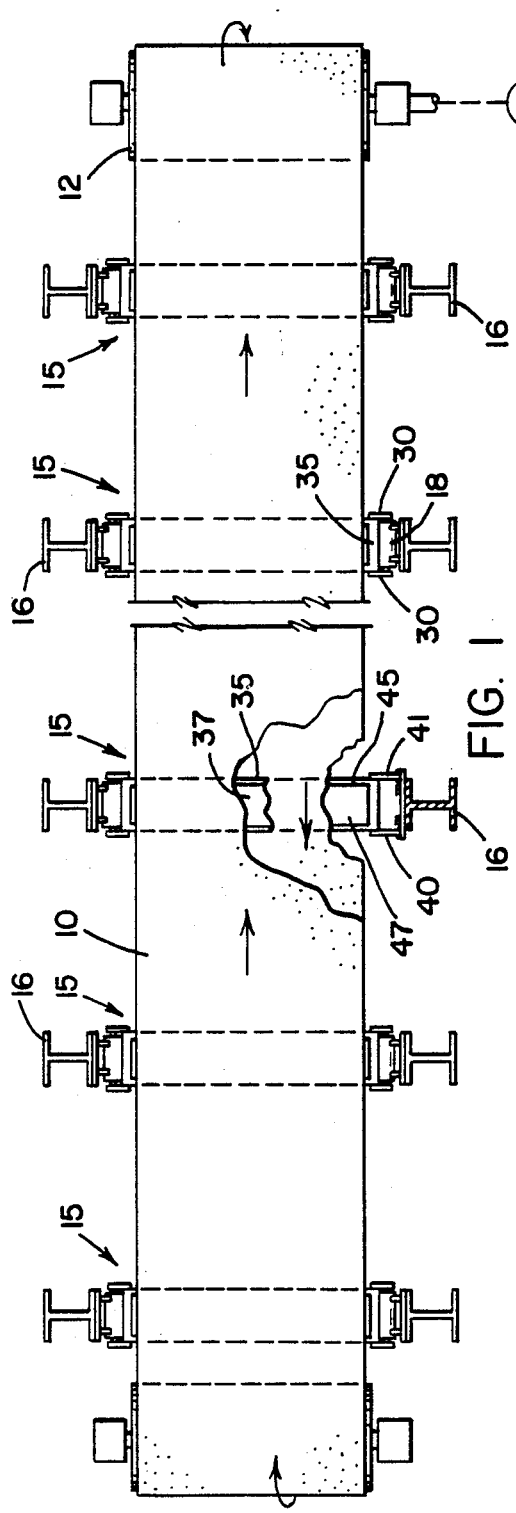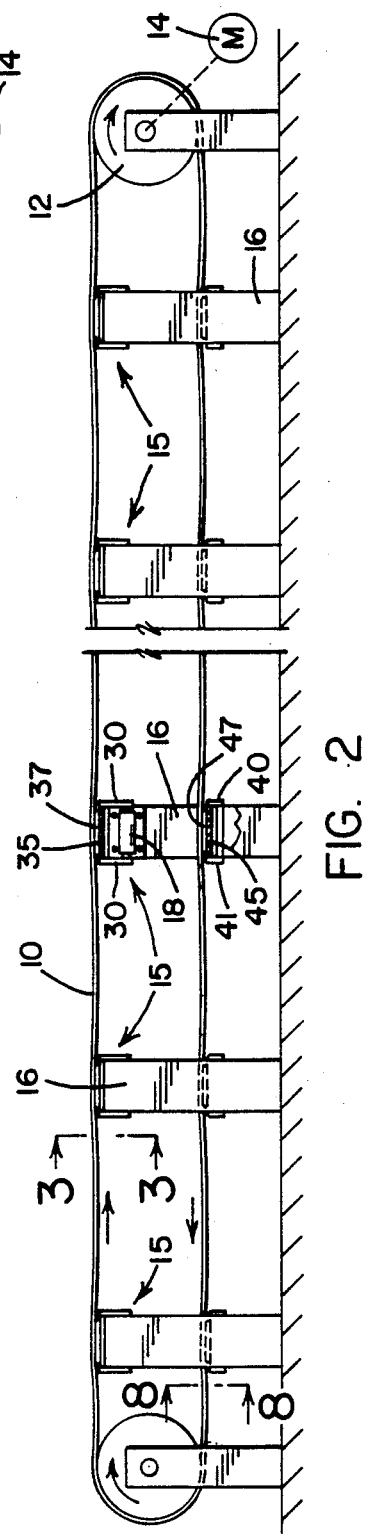

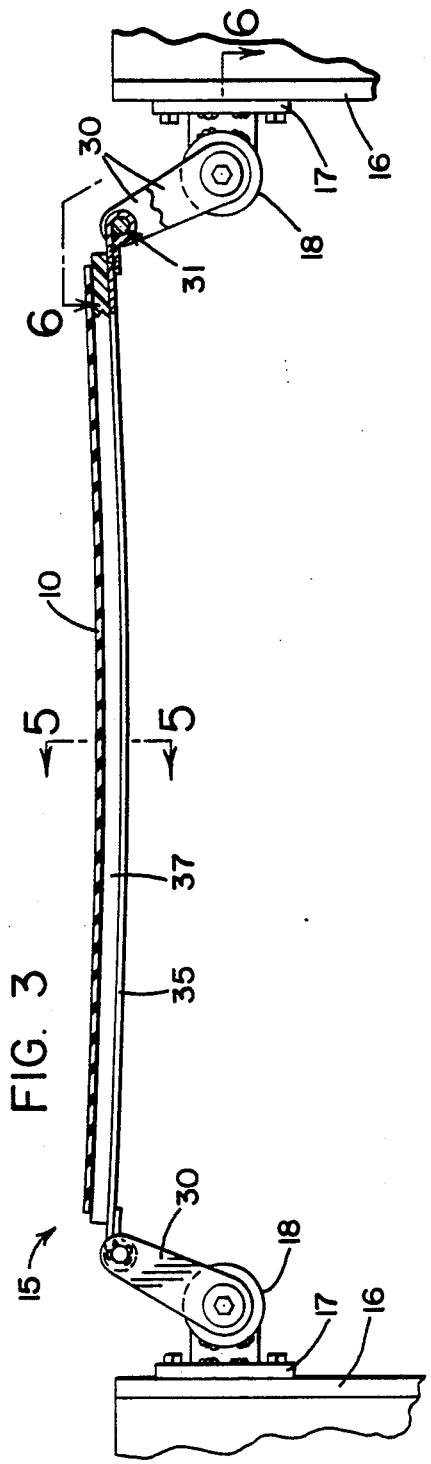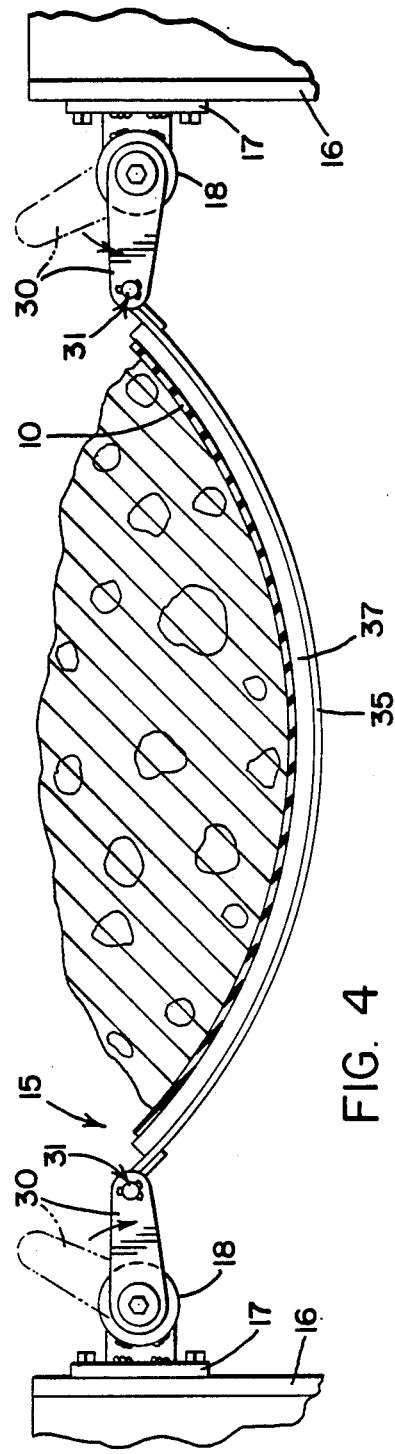

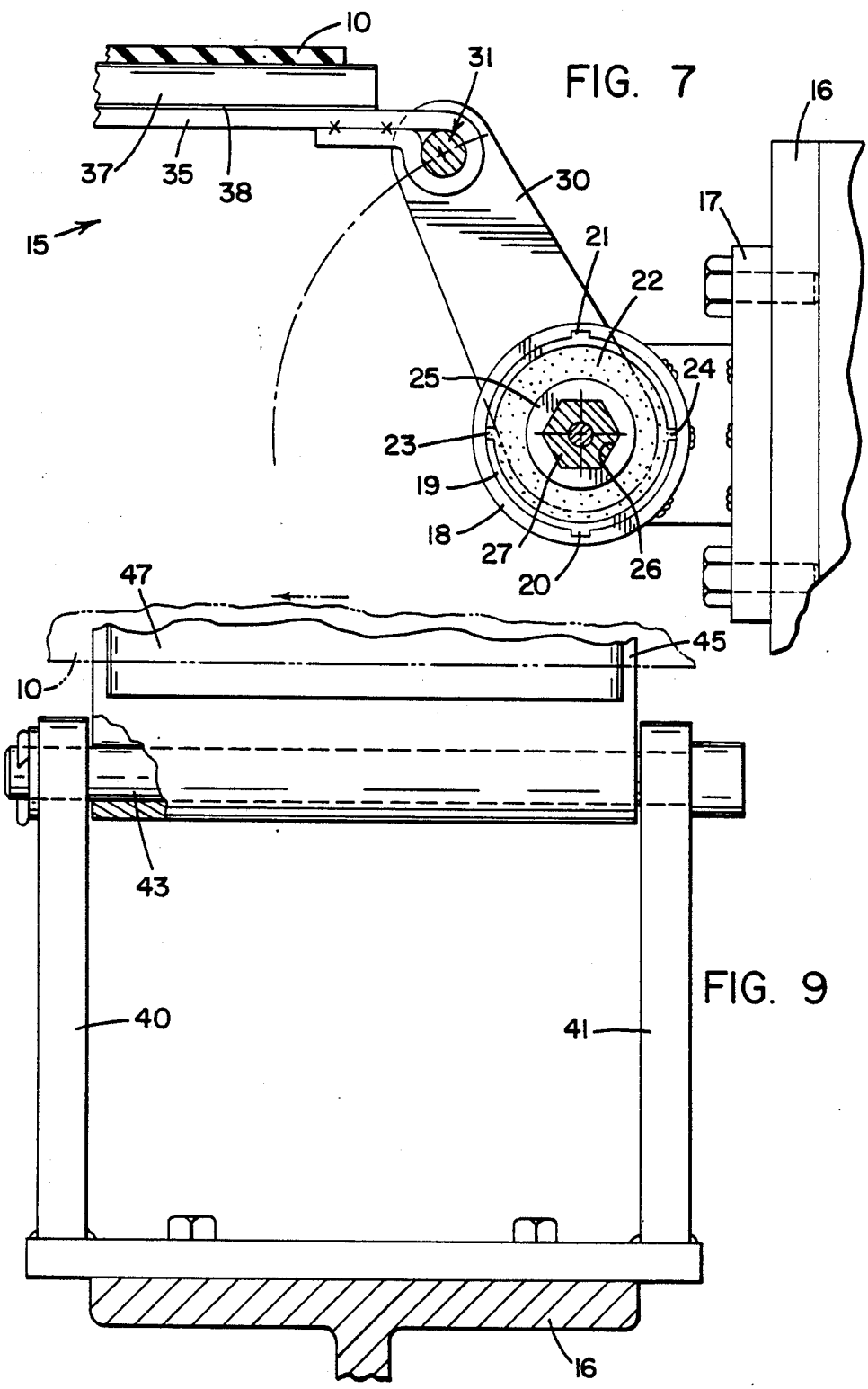

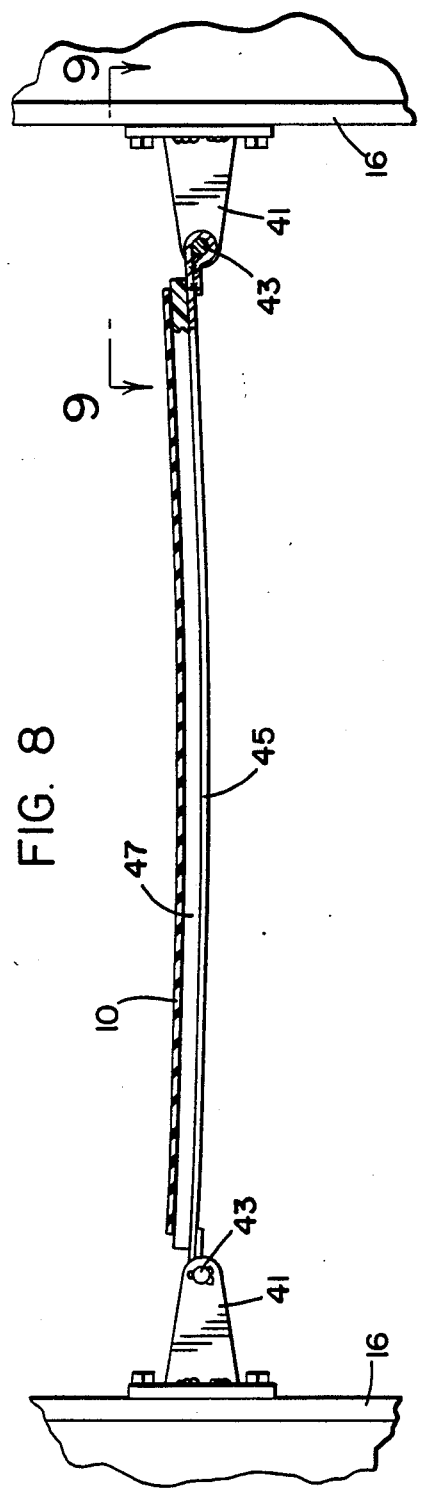

4,927,007

CONVEYOR SUPPORT

BACKGROUND OF THE INVENTION

This invention relates to conveyors and more particularly to a conveyor support for slidingly supporting such conveyor as well as for absorbing the impact forces imposed on the conveyor during the dumping of loads as on the upper run of an endless conveyor.

In order to protect and aid the endless conveyor in the transport of its load, longitudinally spaced idler roll assemblies have been used along the conveying run and the return run to positively support the conveyor in its functioning. The idler roll assembly that formed a troughing support path such as a catenary for the conveyor belt, used rigid rollers or flexible troughing idler rollers on a suspension system such as cables. Rollers were generally mounted on the cables whose respective terminal ends were held in bearings and thus provided a catenary support for a transverse portion of the conveyor run. The use of these idler rollers provided fixed axes of support and a substantially rigid spaced supports along the conveyor run to maintain the integrity of the conveying run. At the loading point of the endless conveyor, the roller assemblies included flexible rollers to absorb the impact which cooperated with the flexible wire cables to help absorb the shock.

SUMMARY

A troughing conveyor support assembly for use in supporting the runs of an endless conveyor belt wherein a pair of laterally spaced rigid supports each have a torsion spring member secured thereto. Each torsion spring has an outer housing secured rigidly to the support and an inner shaft, which shaft is rotatable relative to the outer housing by connection with an elastomeric sleeve. An arm member has one end secured pivotably to the inner shaft and its other end pivotably supporting one end of a tensile flexible backing member that extends between the torsion springs. A strip of low friction material is secured to the top surface of the flexible backing member which yields under load to an arcuate or catenary curve when subjected to a load on a conveyor belt engaging such supporting strip of low friction material.

BRIEF DESCRIPTION OF THE DRAWINGS

FIG. 1 is a fragmentary, somewhat diagrammatic plan view of a belt conveyor system employing a new and improved troughing conveyor support assembly;

FIG. 2 is a fragmentary side elevational view of the belt conveyor system shown in FIG. 1;

FIG. 3 is an enlarged view with a portion thereof in cross section of the troughing run portion of the conveyor support assembly taken on line 3—3 of FIG. 2;

FIG. 4 is the troughing run of the conveyor support assembly as shown in FIG. 3 but under a load;

FIG. 7 is a side elevational view of the conveyor support assembly partly in cross section taken on line 7—7 of FIG. 6;

FIG. 8 is a front elevational view with a portion thereof in cross section of the return run of the conveyor support assembly taken on line 8—8 of FIG. 2;

FIG. 9 is a top plan view of a portion of the support assembly for the bottom return run of the conveyor belt taken on line 9—9 of FIG. 8.

DETAILED DESCRIPTION

Figure 5:
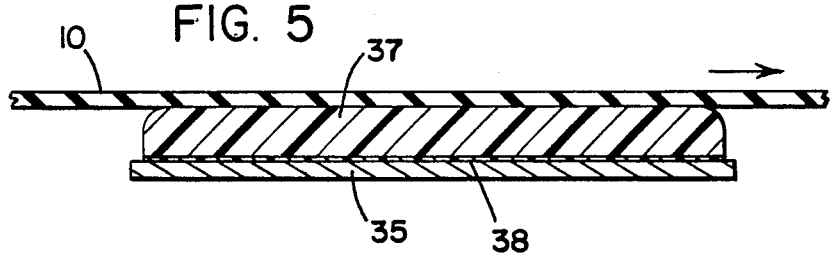
FIG. 5 is an enlarged cross-sectional view of the conveyor support assembly and conveyor belt taken on line 5—5 of FIG. 3.
Figure 6:
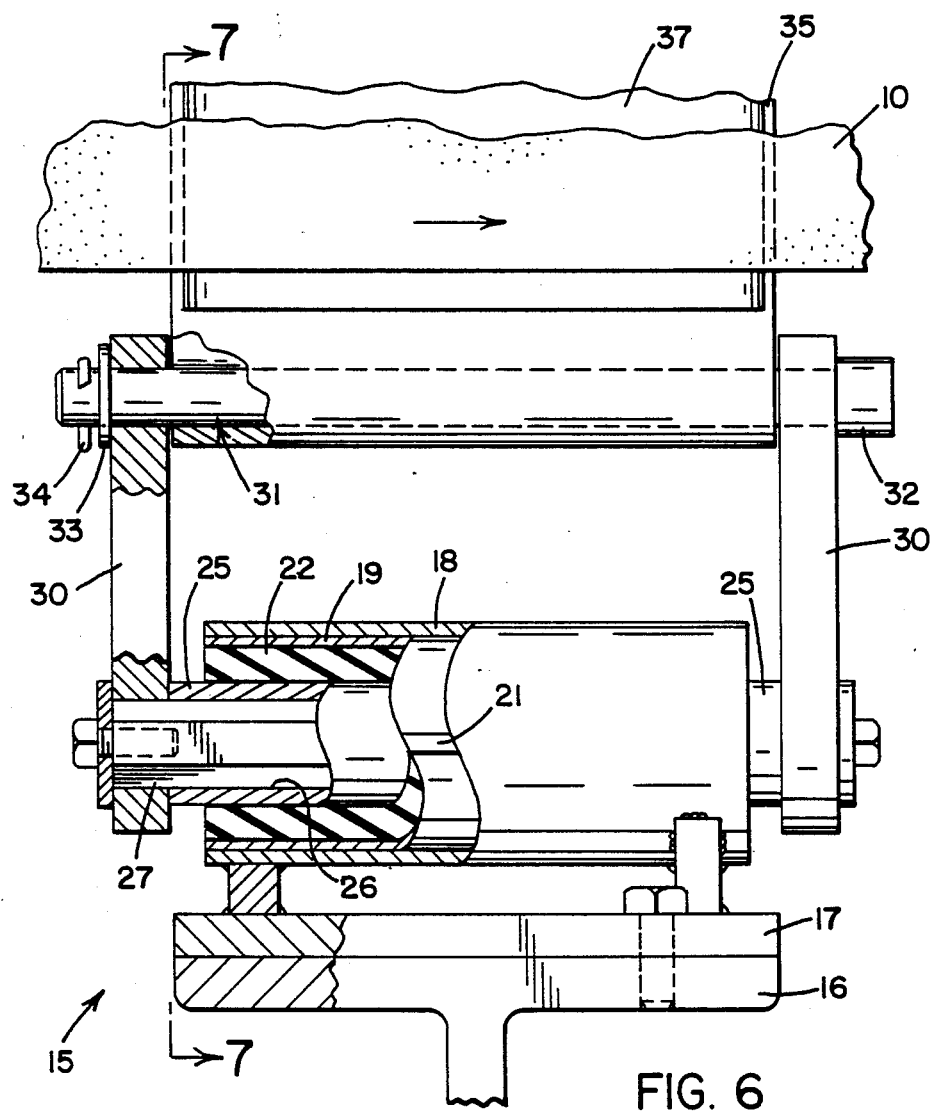
FIG. 6 is a cross-sectional view of the conveyor support assembly and conveyor belt taken on line 6—6 of FIG. 3.

Referring to the drawings wherein like reference numerals describe like or corresponding parts throughout the several views, there is shown in FIGS. 1 and 2 an endless conveyor belt 10 having an upper conveying run and a return run. Such endless conveyor belt 10 is power driven by end roller 12 that is powered by a suitable variable speed motor 14. The endless conveyor belt may extend for a considerable distance and thus requires a plurality of troughing support assemblies 15 along the length of the conveyor belt 10. Such support assemblies may be connected together to provide an integral support means or may be rigidly attached to a suitable base.

Such support assemblies 15 have a pair of laterally spaced beams 16 with brackets 17 suitably attached (as by welding) to a rigid outer shell 18. Such outer shell or shell member 18 is keyed to an inner shell or shell member 19 as at 20 and 21 (FIG. 7). Such shells 18 and 19 may be constructed as a single unit but are shown as two separate elements with inner shell 19 formed of two separate arcuate halves to receive an elastomeric cylindrical sleeve 22 which has two longitudinal strips 23 and 24 to facilitate the attachment of the elastomeric sleeve 22 to the shells 18 and 19 molding operation. Such elastomeric sleeve 22 may have its outer surface suitably bonded to the inner circumferential surface of the shells.

The inner circumferential surface of the elastomeric sleeve 22 is bonded to a cylindrical shaft 25 which has an octagonal bore 26. Such bore 26 receives an octagonal shaft 27 whose end portions receive one end of arm or lever members 30. The outer shell 18 and inner shell 19 along with the elastomeric sleeve 22 with the shafts 25 and 27 form a torsion spring for a purpose to be described. The other end portions of lever members 30 have bores to receive a rotatable shaft 31. Shaft 31 is retained in position on the respective arm or lever members 30 by having one end of such shaft 31 of larger diameter as at 32 and a washer 33 with a cotter pin 34 suitably mounted at the other end.

Pairs of laterally aligned support assemblies 15 have their respective rotatable shafts 31 support the respective ends of a longitudinally extending flexible belt support backing member or strap 35. Such backing member or strap 35 is in tension and held in a generally horizontal flat position between the two spaced shafts 31. As shown in FIG. 7, the respective ends of the backing member 35 are wrapped around the shafts 31 and suitably stitched or tacked to the backing member itself.

A suitable layer or strip of low friction material 37 is attached to the top surface of the backing member 35. Such strip 37 may be formed of an ultra-high molecular weight polyethylene material because of its tensile strength and wear characteristics. The ultra high molecular weight layer is bonded to the tensile backing member 35 such that on cooling the ultra high molecular weight polyethylene material will shrink on cooling giving a natural curl to the elongated belt support consisting of the backing strip 35 and the ultra high molecular weight polyethylene strip 37. As more clearly shown in FIG. 7, a thin layer of rubber or elastomeric material 38 is used between strip 35 and strip 37 to provide a secure means for adhering these members together.

The conveyor belt support for the lower run as shown in FIGS. 1, 2 and 9 include a pair of arm members 40 and 41 that have their one ends secured to laterally spaced beams 16 and their other ends journaling a shaft 43 that supports the respective ends of a backing member 45 (similar to backing member 35) which has adhered to its top surface a strip of low friction material 47 similar to the strip 37 as described above.

In the operation of the above described troughing conveyor belt support assembly, the torsion springs in their normal condition when no load is on the conveyor belt, the backing member 35 is substantially in a horizontal position as illustrated in FIG. 3. As the conveyor belt 10 is loaded with material for transport, a force is exerted onto the conveyor belt 10 and its support structure of the backing member or strap 35 and the low friction material strip 37. Such action exerts an inward force on the respective torsion springs such that respective laterally spaced arm members 30 will pivot inwardly (counterclockwise on arm member 30 as viewed in FIG. 7) to exert a rotative force on the elastomeric sleeve 22 which is resisted by the outer stationary shells 18 and 19, such that the conveyor belt will assume a catenary curve as depicted by FIG. 4. As the belt 10 travels over the top layer 37 of low friction material, support is provided for the load and by responding to the load imposed thereon assume an arcuate shape to retain the load thereon.

I claim:

1. A troughing conveyor support assembly for supporting a conveyor belt for longitudinal movement thereover comprising an elongated flexible belt support, said belt support having an elongated and transversely extending flexible backing layer, said backing layer having a layer of low friction material adhered thereto for supporting the passage of said conveyor belt thereover, said backing layer having a pair of end portions, a pair of torsion springs, each torsion spring having a shell member and a shaft member, each of said torsion springs having an elastomeric sleeve interconnecting said shell member and said shaft member for relative rotational movement of one of said members relative to the remaining one of said members, each torsion spring having one of said members connected to one of said end portions of said backing layer, a pair of rigid supports respectively connected to the other one of said members of said torsion springs to provide a catenary support to said conveyor belt under load.

2. A troughing conveyor support assembly as set forth in claim 1 wherein each of said elastomeric sleeves are under compression by the interconnection between said shell members and said shaft members with said elastomeric members.

3. A troughing conveyor support assembly as set forth in claim 2 wherein said relative rotational movement of one of said members relative to the remaining one of said members defines an axis that lies in a direction that is normal to a plane that contains said elongated flexible belt support.

4. A troughing conveyor support assembly as set forth in claim 2 wherein said layer of low friction material is an ultra high molecular weight polyethylene material.

5. A troughing conveyor support assembly for supporting a conveyor belt for longitudinal movement thereover comprising a pair of laterally spaced rigid supports, an outer shell member secured to each of said supports, each shell member having an inner peripheral surface, an elastomeric sleeve secured to said inner peripheral surface of each of said outer shell members, each of said sleeves having an inner peripheral surface, a shaft member secured to the said inner peripheral surface of each of said sleeves, each of said shafts having an axis, an arm member having one end pivotally secured to each of said shafts for pivoting about said axis of said respective shafts, a flexible backing member having spaced ends that extend between said rigid supports, the other ends of said arm members pivotally securing the respective end of said flexible backing member that extends between said rigid supports, and a strip of low friction material secured to said backing member and yielding therewith to assume a catenary curve under a loaded conveyor belt supported thereby.

* * * * *